(12) United States Patent
Low

(10) Patent No.: US 11,586,099 B2
(45) Date of Patent: Feb. 21, 2023

(54) AUTOMOTIVE CAMERA WITH INTEGRATED INDUCTION HEATER

(71) Applicant: Aptiv Technologies Limited, St. Michael (BB)

(72) Inventor: Yew Kwang Low, Woodlands (SG)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 0 days.

(21) Appl. No.: 17/027,109

(22) Filed: Sep. 21, 2020

(65) Prior Publication Data

US 2022/0091483 A1    Mar. 24, 2022

(51) Int. Cl.
  *G03B 17/55*    (2021.01)
  *H04N 5/225*    (2006.01)
  *H05B 3/84*    (2006.01)

(52) U.S. Cl.
  CPC ........... *G03B 17/55* (2013.01); *H04N 5/2252* (2013.01); *H04N 5/2253* (2013.01); *H04N 5/2254* (2013.01); *H05B 3/84* (2013.01)

(58) Field of Classification Search
  CPC .... G03B 17/55; H04N 5/2252; H04N 5/2253; H04N 5/2254; H05B 3/84
  See application file for complete search history.

(56) References Cited

U.S. PATENT DOCUMENTS

| | | | |
|---|---|---|---|
| 9,995,990 B2 | 6/2018 | Lim et al. | |
| 10,146,049 B2 | 12/2018 | Moncino et al. | |
| 10,209,512 B2 | 2/2019 | Bulgajewski et al. | |
| 10,623,611 B2 | 4/2020 | Rowski et al. | |
| 2006/0171704 A1* | 8/2006 | Bingle | B60R 11/04 396/419 |
| 2012/0170119 A1 | 7/2012 | Chu et al. | |
| 2014/0125849 A1* | 5/2014 | Heimgartner | H01L 27/14687 359/359 |
| 2018/0027155 A1* | 1/2018 | Nakamura | G02B 7/04 348/374 |
| 2018/0113377 A1* | 4/2018 | Hsia | H04B 5/0087 |
| 2018/0210161 A1* | 7/2018 | Park | H04N 5/2257 |
| 2020/0314311 A1* | 10/2020 | Liu | G02B 7/028 |
| 2021/0208387 A1* | 7/2021 | Karam | G02B 26/005 |

FOREIGN PATENT DOCUMENTS

DE    102016107545 A1    10/2017

* cited by examiner

*Primary Examiner* — Amy R Hsu
(74) *Attorney, Agent, or Firm* — RMCK Law Group, PLC

(57) ABSTRACT

An external camera for a vehicle and its method of manufacture involve providing a camera assembly comprising a lens assembly comprising a lens and a lens holder that houses at least a portion the lens assembly and defining an inner surface, forming an induction coil integrated in the inner surface of the lens holder, the induction coil being configured to generate heat energy to defrost the lens, providing a camera housing that houses the camera assembly, and housing the camera assembly within the camera housing to form the external camera.

20 Claims, 3 Drawing Sheets

AUTOMOTIVE CAMERA WITH INTEGRATED INDUCTION HEATER

FIELD

The present disclosure generally relates to automotive cameras and, more particularly, to an automotive camera with an integrated induction heater.

BACKGROUND

Today's vehicles often include one or more external cameras each configured to capture images of an environment surrounding the vehicle. One such example of an external camera is a front-facing external camera. The captured front-facing images can be used for a variety of safety, automotive driver assistance (ADAS), and autonomous driving features. Non-limiting examples of these applications include object detection/tracking, adaptive cruise control, and automated braking or collision avoidance. Due to its external arrangement, at least some portions of the camera could be susceptible to the elements. For example, during cold weather conditions, frost can accumulate on a lens of the camera. Defrosting the camera lens takes time and conventional heating systems are costly, bulky, and suffer from complex assembly issues. Therefore, while such conventional camera lens heating systems work for their intended purpose, there exists an opportunity for improvement in the relevant art.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to some aspects of the present disclosure, an external camera for a vehicle is presented. In one exemplary implementation, the camera comprises a camera assembly comprising a lens assembly comprising a lens, an induction coil configured to generate heat energy to defrost the lens, and a lens holder that houses at least a portion the lens assembly and defining an inner surface that has the induction coil integrated therein, and a camera housing that houses the camera assembly.

In some implementations, the induction coil is formed in the inner surface of the lens holder via laser direct structuring (LDS). In some implementations, the lens holder is formed of a liquid crystal polymer (LCP). In some implementations, the lens assembly comprises a metal barrel that houses the lens and is at least partially inserted into the lens holder.

In some implementations, the camera assembly further comprises a lens holder cap that attaches to a first end of the lens holder and an ultraviolet (UV) curable adhesive arranged between the metal barrel and the lens holder cap. In some implementations, the camera assembly further comprises an image sensor holder that attaches to a second opposing end of the lens holder and receives an image sensor.

In some implementations, the camera housing defines a first exposed portion where a portion of the lens assembly is exposed and a second exposed portion where an external electrical connection to the camera assembly can be formed.

In some implementations, the camera housing is formed by placing the camera assembly in a mold and molding-in-place a material to form the camera housing.

According to another aspect of the present disclosure, a method of manufacturing an external camera for a vehicle is presented. In one exemplary implementation, the method comprises providing a camera assembly comprising a lens assembly comprising a lens and a lens holder that houses at least a portion the lens assembly and defining an inner surface, forming an induction coil integrated in the inner surface of the lens holder, the induction coil being configured to generate heat energy to defrost the lens, providing a camera housing that houses the camera assembly, and housing the camera assembly within the camera housing to form the external camera.

In some implementations, forming the induction coil integrated in the inner surface of the lens holder comprises utilizing LDS. In some implementations, the lens holder is formed of an LCP. In some implementations, the lens assembly comprises a metal barrel that houses the lens and is at least partially inserted into the lens holder.

In some implementations, the camera assembly further comprises a lens holder cap and an UV curable adhesive, and the method further comprises attaching the lens holder cap to a first end of the lens holder and providing and curing the UV curable adhesive between the metal barrel and the lens holder cap. In some implementations, the camera assembly further comprises an image sensor holder and an image sensor, and the method further comprises receiving the image sensor in the image sensor holder and attaching the image sensor holder to a second opposing end of the lens holder.

In some implementations, the camera housing defines a first exposed portion where a portion of the lens assembly is exposed and a second exposed portion where an external electrical connection to the camera assembly can be formed. In some implementations, the method further comprises forming the camera housing by placing the camera assembly in a mold and molding-in-place a material to form the camera housing.

According to yet another aspect of the present disclosure, an external camera for a vehicle is presented. In one exemplary implementation, the camera comprises a camera assembly means comprising a lens assembly means comprising a lens means, an induction coil means for generating heat energy to defrost the lens means, and a lens holder means for housing at least a portion the lens assembly means and for defining an inner surface that has the induction coil means integrated therein, and a camera housing means for housing the camera assembly.

In some implementations, the induction coil means is formed in the inner surface of the lens holder means via LDS. In some implementations, the lens holder means is formed of an LCP. In some implementations, the lens assembly means comprises a metal barrel means for housing the lens means and for at least partial insertion into the lens holder means, the camera assembly means further comprises a lens holder cap means for attaching to a first end of the lens holder means and an ultraviolet (UV) curable adhesive means arranged between the metal barrel means and the lens holder cap means, and the camera assembly means further comprises an image sensor holder means for attaching to a second opposing end of the lens holder means and for receiving an image sensor means.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As discussed above, conventional automotive external camera (e.g., external front-facing camera) lens heating systems are typically costly, bulky, and suffer from complex assembly issues. One conventional lens heating system, for example, utilizes a lens cap heater with a window that attaches to the camera lens. This conventional lens heating system utilizes a resistive heating element and is costly and bulky due to the extra required parts and is not particularly efficient as it provides resistive heating of the camera lens from the outside/external environment. In addition, this conventional lens heating system creates assembly issues because it is difficult to secure the wire elements between the various components to guarantee fixation.

Accordingly, an improved automotive camera with an integrated induction heater is presented herein. This camera comprises an induction coil that is etched into an internal surface of the camera lens holder. This etching could be performed, for example, via laser direct structuring (LDS). In one exemplary implementation, the lens holder is formed of a liquid crystal polymer (LCP). The lens holder with the integrated induction coil is then assembled with the remaining parts of the camera and molded in place to form a fully integrated unit. Potential benefits of this camera configuration include, but are not limited to, (i) scalable power for fast and safe heating to achieve more efficient lens defrosting (e.g., induction heating compared to resistive heating), (ii) compact size due to integrated induction coil, (iii) surface mount technology (SMT) compatibility (at component level), (iv) moldable assembly (at module level), (v) no wire fixation issues as described above, and (vi) a mass producible component level camera.

Figure 1A:
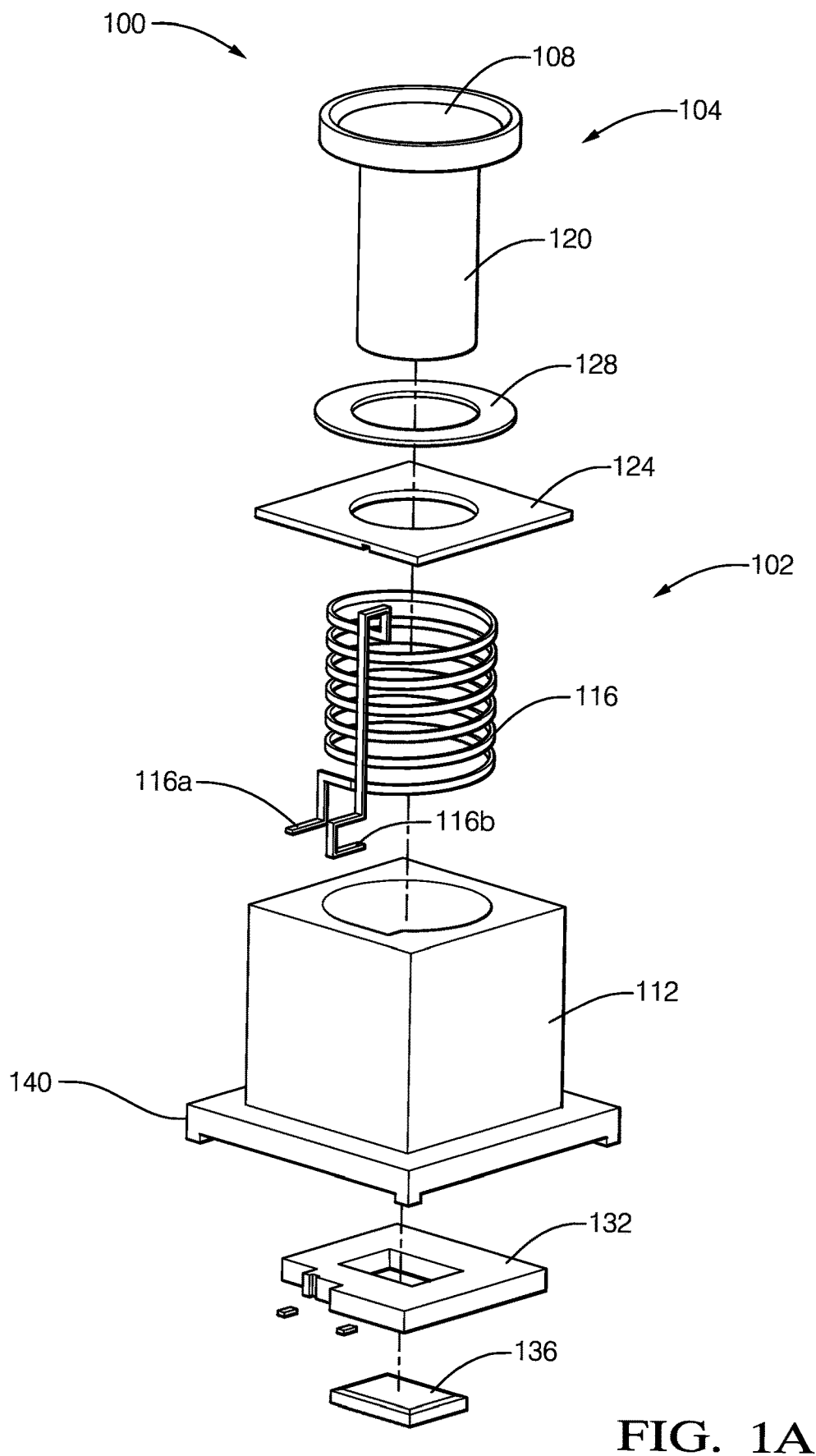
FIG. 1A is an exploded view of an example camera with an integrated induction heater according to some implementations of the present disclosure.
Figure 1B:
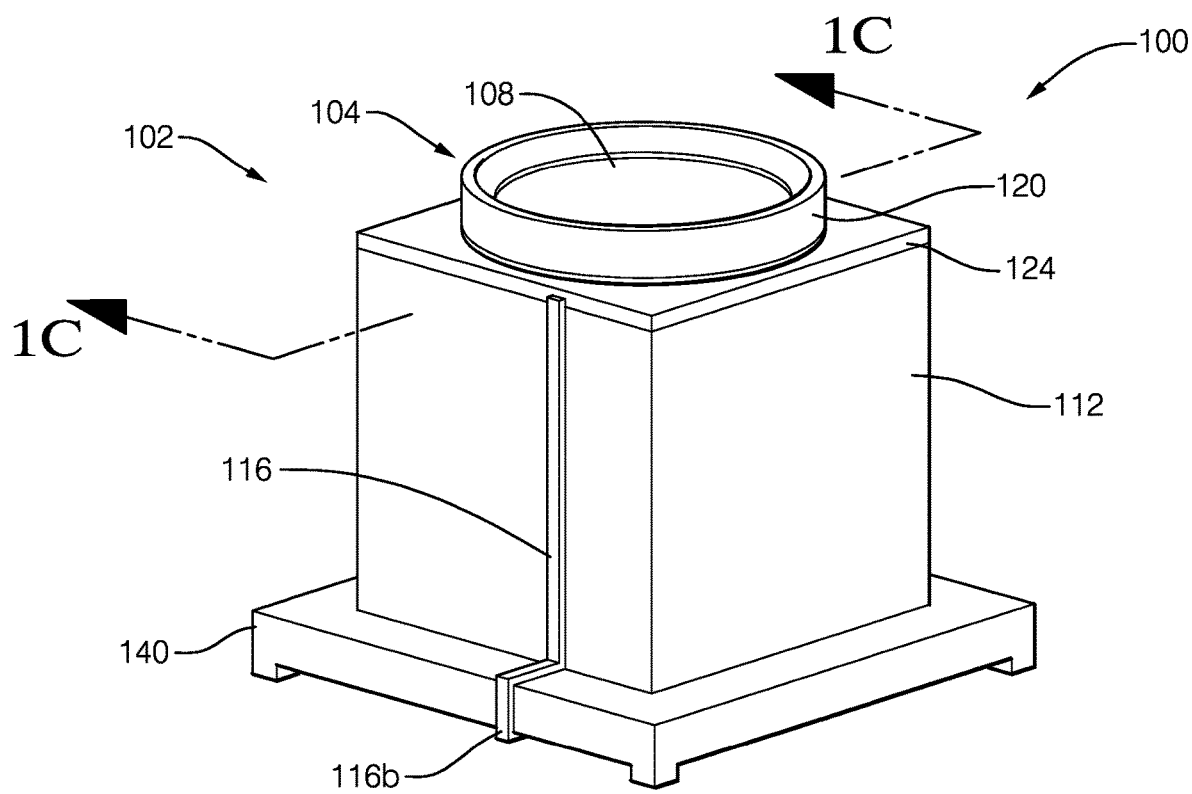
FIGS. 1B-1C are perspective and cross-sectional views of the example camera with an integrated induction heater according to some implementations of the present disclosure.
Figure 1C:
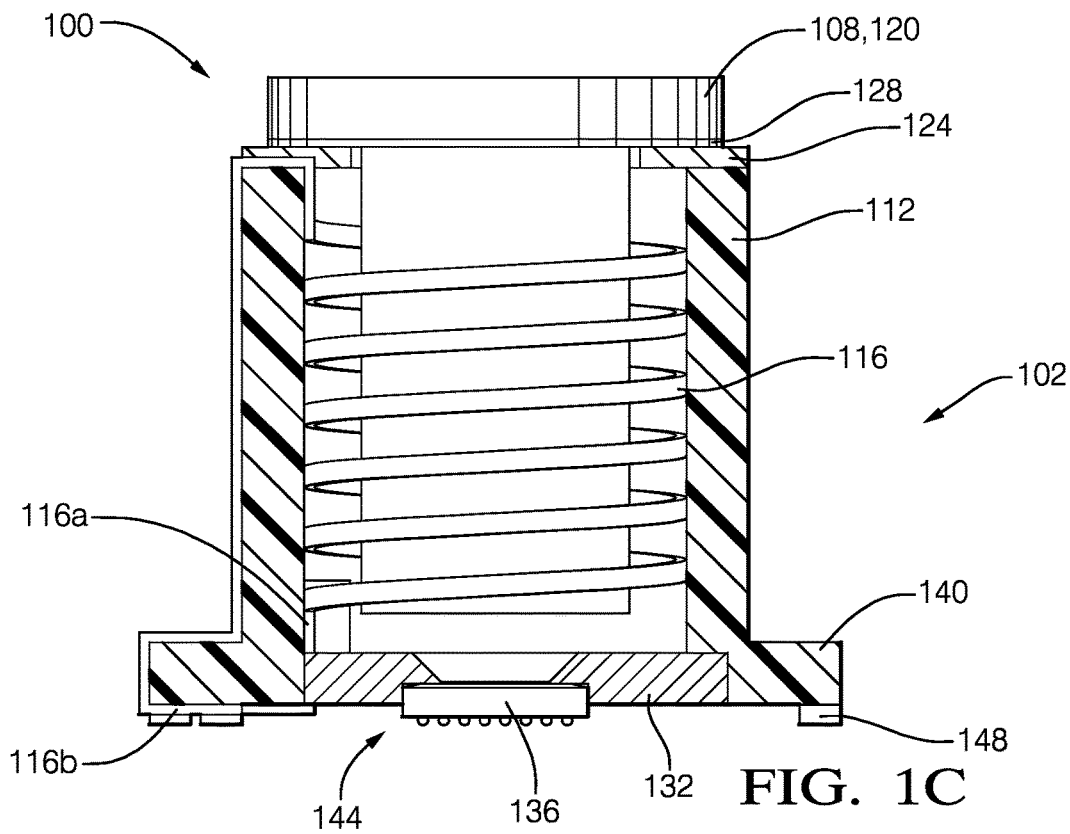

Referring now to FIGS. 1A-1C, exploded, perspective, and cross-sectional views, respectively, of an example external camera 100 for a vehicle according to some implementations of the present disclosure are illustrated. The camera 100 generally comprises a camera assembly 102 comprising a lens assembly 104 comprising a lens 108 and a lens holder 112 defining an inner surface having an induction coil 116 integrated therein. It will be appreciated that any suitable type of lens 108 could be utilized, such as a lens 108 having a heat-conductive coating (discussed in more detail below). The induction coil 116 defines opposing first and second ends 116a, 116b that, when connected to a power source, cause currently to flow through the induction coil 116 thereby generating a magnetic field and in turn via magnetic induction, heat energy, which can be utilized to thaw or defrost the lens 108.

In one exemplary implementation, the induction coil 116 is formed in the inner surface of the lens holder 112 via laser direct structuring (LDS). LDS generally involves the use of a thermoplastic material doped with a metallic inorganic compound that is then activated by means of laser. More specifically, the laser forms the course of the circuit trace on the thermoplastic material (i.e., the inner surface of the lens holder 112) and conductive layers (e.g., copper layers) can be raised in this trace. Induction heating via the induction coil 116 also provides for faster and safer lens defrosting compared to other methods, such as resistive heating. In one exemplary implementation, the lens holder 112 is formed of an LCP. The lens assembly 104 further comprises a metal barrel 120 that houses the lens 108. The metal composition of the metal barrel allows for the induction heating of the lens 108 by the induction coil 116. The metal barrel 120 is at least partially inserted into the lens holder 112 such that the induction coil 116 surrounds the metal barrel 120. A lens holder cap 124 and an ultraviolet (UV) curable seal 128 are provided therebetween to attach the components and secure the lens assembly 104 to a first end of the lens holder 112. It will be appreciated that additional or other types of seals could be utilized (e.g., thermally curable seals).

The camera 100 further comprises an image sensor holder 132 that receives an image sensor 136. The image sensor 136 could be attached to the image sensor holder 132 via any suitable means. The image sensor 136 and the lens 104 are collectively utilized to capture images of an environment external to a vehicle having the camera 100. The image sensor holder 132 is also attached to an opposing second end of the lens holder 112 via any suitable means. In one exemplary implementation, the lens holder 112 and the image sensor holder 132 are both preassembled and placed into a pallet with an image sensor docking jig to produce live video image linked to an auto-alignment (AA) or calibration microcontroller, such as for modulation transfer function (MTF) calibration (i.e., the measurement of the optical performance potential or resolution of the lens 108).

In some implementations, the lens 108 and the metal barrel 120 are auto-aligned to the lens holder 112. This could include, for example, coating an outermost or exposed surface of the lens with a heat conductive coating, such as a hard carbon coating, to further conduct heat induced into the metal barrel 120 via the induction coil 116. The camera 100 further comprises a back plate 140, which could be part of the lens holder 112 or could be separately formed. Once the components are assembled/attached as described above, a reflowable camera assembly 102 with an integrated induction heating coil is obtained. The camera assembly 102 can then be housed by a final camera housing to complete the camera 100. This could include, for example only, placing the camera assembly in a mold and molding-in-place a material (e.g., a plastic) to form a final housing of the camera 100. As shown in FIG. 1C, a portion of the final housing could be left exposed (e.g., see 144, 148) such that electrical connections can be made to the camera assembly 102 (e.g., to the induction coil 116 via ends 116a, 116b and to the image sensor 136 and any other on-board electronics (e.g., a printed circuit board, or PCB).

Figure 2:
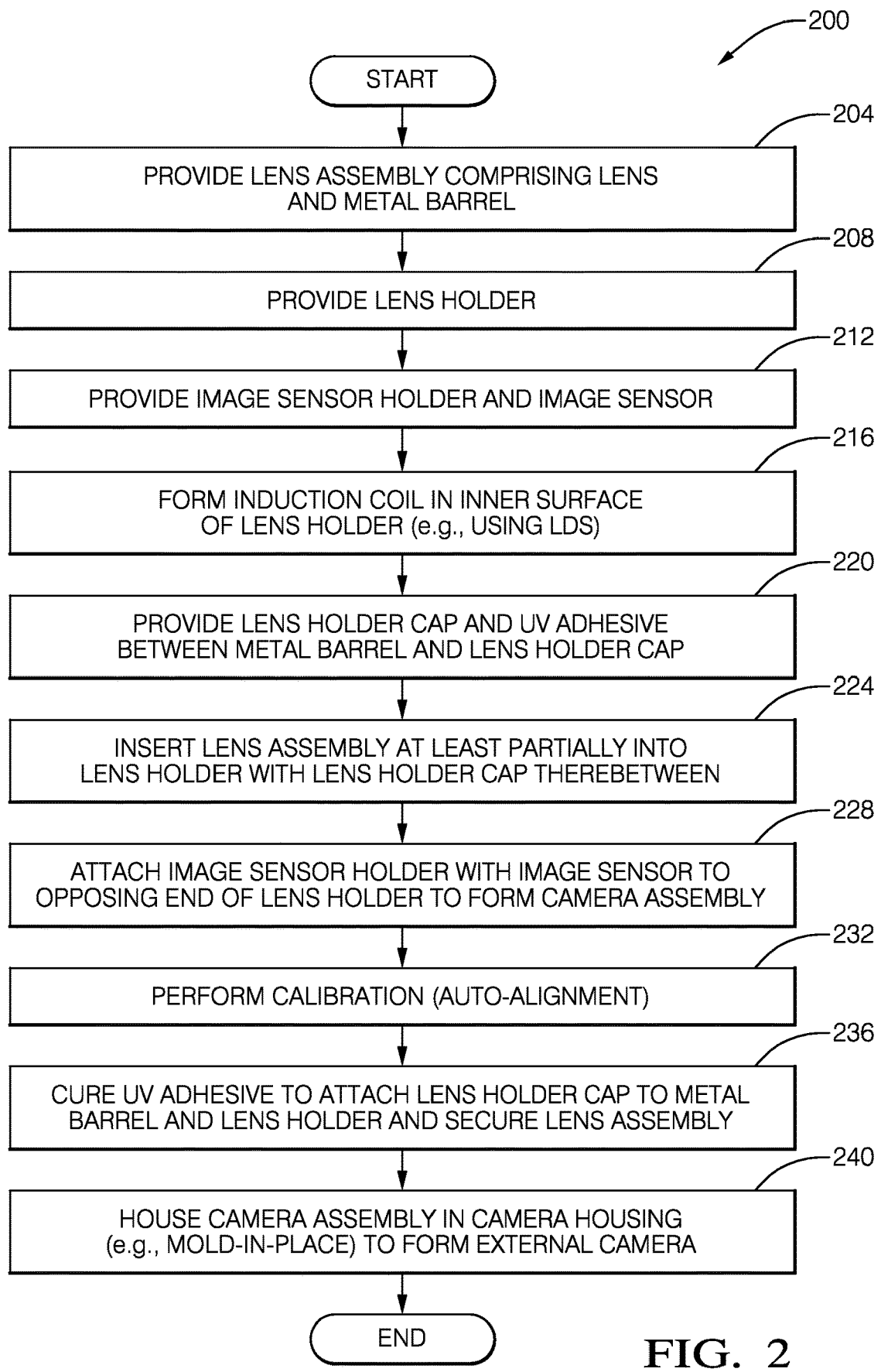
FIG. 2 is a flow diagram of an example method of manufacturing an external automotive camera with an integrated induction heater according to some implementations of the present disclosure.

Referring now to FIG. 2, a flow diagram of an example method 200 of manufacturing an external automotive camera with an integrated induction heater according to the principles of the present disclosure is illustrated. While described with respect to the components of camera 100, it will be appreciated that the method 200 could be utilized to manufacture different yet similar camera designs or configurations. At 204, the lens assembly 104 is provided. At 208, the lens holder 112 is provided. At 212, the image sensor holder 132 with the image sensor 136 secured therein is provided. At 216, the induction coil 116 is formed in the inner surface of the lens holder 112. For example, the lens holder 112 could be preassembly having the induction coil 116 integrated therein. At 220, the lens holder cap 124 is provided and the UV adhesive 128 is provided between the metal barrel 120 of the lens assembly 104 and the lens holder cap 124. At 224, the lens assembly 104 (i.e., a majority of the metal barrel 120) is inserted into the lens holder 112. At 228, the image sensor holder 132 with the image sensor 136 attached thereto is attached to the opposing end of the lens holder 112. At 232, calibration (e.g., auto-alignment) is performed. At 236, the UV adhesive 128 is cured to attach the lens holder cap 124 to the metal barrel 120 and the lens holder 112 thereby securing the lens assembly 104 after calibration. Finally, at 240, the camera assembly 102 is housed in a final camera housing. For example only, the camera assembly 102 could be inserted into a mold and molded-in-place to form the final camera housing and obtain the camera 100. The method 200 then ends or returns to 204 for another manufacturing cycle. It will also be appreciated, as described previously herein, that some of the operations of method 200 could be performed in a different order than as shown and numerically referenced.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An external camera for a vehicle, the camera comprising:
    a camera assembly comprising:
        a lens assembly comprising a lens;
        an induction coil configured to generate heat energy to defrost the lens;
        a lens holder that houses at least a portion the lens assembly and defining an inner surface that has the induction coil integrated therein;
        a lens holder cap configured to attach to a first end of the lens holder;
        an ultraviolet (UV) curable adhesive arranged between the lens assembly and the lens holder cap; and
        an image sensor holder that attaches to a second opposing end of the lens holder and receives and fixes an image sensor therein; and
    a camera housing that houses the camera assembly such that a portion of the lens assembly and an electrical connection portion of the image sensor are exposed.

2. The camera of claim 1, wherein the induction coil is formed in the inner surface of the lens holder via laser direct structuring (LDS).

3. The camera of claim 2, wherein the lens holder is formed of a liquid crystal polymer (LCP).

4. The camera of claim 1, wherein the lens assembly comprises a metal barrel that houses the lens and is at least partially inserted into the lens holder.

5. The camera of claim 4, further comprising a heat conductive coating is applied to an outermost or exposed surface of the lens to further conduct heat induced into the metal barrel via the induction coil.

6. The camera of claim 1, wherein the camera housing is formed by placing the camera assembly in a mold and molding-in-place a material to form the camera housing.

7. The camera of claim 1, wherein:
    the lens holder and the image sensor holder are both preassembled and placed into a pallet with an image sensor docking jig to produce live video image linked to an auto-alignment (AA) or calibration microcontroller configured to perform a modulation transfer function (MTF) calibration including the measurement of the optical performance potential or resolution of the lens; and the UV curable adhesive is subsequently cured after integration of the lens holder and the image sensor holder with the image sensor into the camera assembly and housing.

8. The camera of claim 1, wherein the exposure of the portion of the lens assembly and the electrical connection portion of the image sensor provides for at least one of surface mount technology (SMT) compatibility at a component level, moldable assembly compatibility at a module level, and camera mass producibility.

9. A method of manufacturing an external camera for a vehicle, the method comprising:
providing a camera assembly comprising:
a lens assembly comprising a lens;
a lens holder that houses at least a portion the lens assembly and defining an inner surface;
a lens holder cap configured to attach to a first end of the lens holder;
an ultraviolet (UV) curable adhesive arranged between the lens assembly and the lens holder cap; and
an image sensor holder that attaches to a second opposing end of the lens holder and receives and fixes an image sensor therein;
forming an induction coil integrated in the inner surface of the lens holder, the induction coil being configured to generate heat energy to defrost the lens;
providing a camera housing that houses the camera assembly such that a portion of the lens assembly and an electrical connection portion of the image sensor are exposed; and
housing the camera assembly within the camera housing to form the external camera.

10. The method of claim 9, wherein forming the induction coil integrated in the inner surface of the lens holder comprises utilizing laser direct structuring (LDS).

11. The method of claim 10, wherein the lens holder is formed of a liquid crystal polymer (LCP).

12. The method of claim 9, wherein the lens assembly comprises a metal barrel that houses the lens and is at least partially inserted into the lens holder.

13. The method of claim 12, further comprising applying a heat conductive coating to an outermost or exposed surface of the lens to further conduct heat induced into the metal barrel via the induction coil.

14. The method of claim 9, further comprising forming the camera housing by placing the camera assembly in a mold and molding-in-place a material to form the camera housing.

15. The method of claim 9, further comprising:
preassembling and placing the lens holder and the image sensor holder into a pallet with an image sensor docking jig to produce live video image linked to an auto-alignment (AA) or calibration microcontroller configured to perform a modulation transfer function (MTF) calibration including the measurement of the optical performance potential or resolution of the lens; and
subsequently curing the UV curable adhesive after integration of the lens holder and the image sensor holder with the image sensor into the camera assembly and housing.

16. The method of claim 9, wherein the exposure of the portion of the lens assembly and the electrical connection portion of the image sensor provides for at least one of surface mount technology (SMT) compatibility at a component level, moldable assembly compatibility at a module level, and camera mass producibility.

17. An external camera for a vehicle, the camera comprising:
a camera assembly means comprising:
a lens assembly means comprising a lens means;
an induction coil means for generating heat energy to defrost the lens means;
a lens holder means for housing at least a portion the lens assembly means and for defining an inner surface that has the induction coil means integrated therein;
a lens holder cap means configured to attach to a first end of the lens holder means;
an ultraviolet (UV) curable adhesive means arranged between the lens assembly means and the lens holder cap means; and
an image sensor holder means that attaches to a second opposing end of the lens holder means and receives and fixes an image sensor means therein; and
a camera housing means for housing the camera assembly such that a portion of the lens assembly means and an electrical connection portion of the image sensor means are exposed.

18. The camera of claim 17, wherein the induction coil means is formed in the inner surface of the lens holder means via laser direct structuring (LDS).

19. The camera of claim 18, wherein the lens holder means is formed of a liquid crystal polymer (LCP).

20. The camera of claim 17, wherein the lens assembly means comprises a metal barrel means for housing the lens means and for at least partial insertion into the lens holder means.

* * * * *